Figure 1:
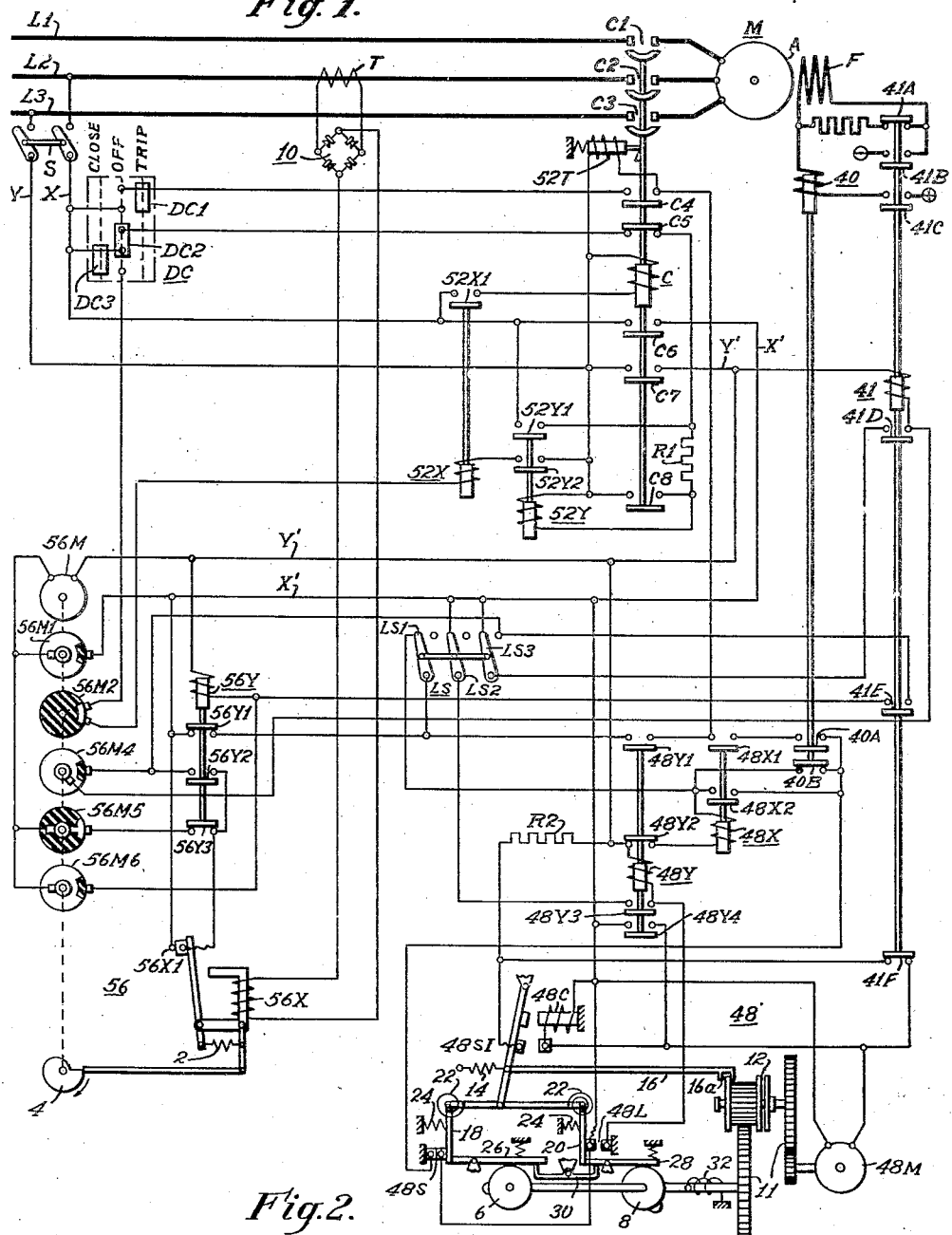

Sept. 24, 1946.    M. A. PRINGLE    2,408,226
CONTROL SCHEME
Filed June 3, 1944    2 Sheets-Sheet 1

WITNESSES:
Edward Michaels
E. F. Oberheim

INVENTOR
Mark A. Pringle.
BY
Paul E. Friedemann
ATTORNEY

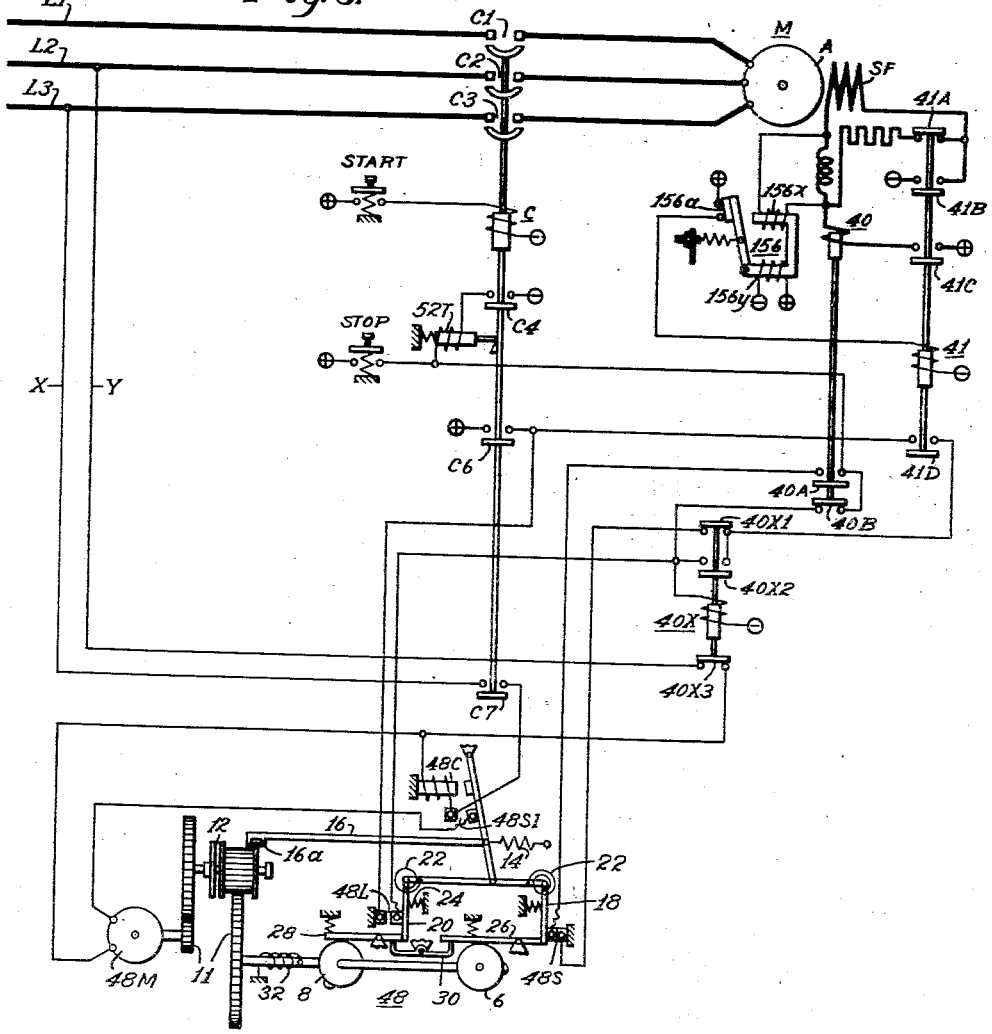

Patented Sept. 24, 1946

2,408,226

UNITED STATES PATENT OFFICE 2,408,226

CONTROL SCHEME

Mark A. Pringle, Pittsburgh, Pa., assignor to Westinghouse Electric Corporation, East Pittsburgh, Pa., a corporation of Pennsylvania Application June 3, 1944, Serial No. 538,683

7 Claims. (Cl. 172—289)

This invention relates broadly to a system of control for a motor and more particularly to a system of control for a synchronous motor.

In general, synchronous motors are started as induction motors by energizing the primary or armature windings with alternating current and once the motor speed has reached a value but a few per cent less than synchronous speed, the direct current or field windings are energized and the motor is synchronized to rotate at some speed proportional to the frequency of the alternating line currents.

Systems which provide automatic starting for synchronous motors according to the above-described pattern, are quite often provided with a control or field application device which is responsive to slip frequency and functions when the slip frequency has reached some predetermined low value, usually 5% or less, to connect the field winding or windings to the source of direct current to synchronize the machine. If such control device functions improperly, particularly with motors excited from a source not related to the motor, the field windings may be energized at the beginning of the starting cycle and an attempt thus made by the control system to synchronize the motor at substantially 100% slip. Such a condition may not only seriously damage the synchronous machine, but also such equipment which it may be driving. It is evident that adequate protection against premature field application is desirable.

In addition, protection should be provided against prolonged operation of the motor as an induction motor under excess load, during starting and thereafter, in the event of field failure at the end of the starting cycle, loss of field during normal synchronous motor operation or pulling out of step. Otherwise damage to the electrical elements of the machine may result.

A principal object of this invention is to provide in a system of control for a synchronous motor, protection against premature energization of the field winding.

Another object of this invention is to prevent prolonged operation of the synchronous machine as an excessively loaded induction motor during starting and thereafter.

Another object of this invention is to provide in a system of the character described, protection against field failure or loss of field, either at the end of the starting cycle or during normal synchronous motor operation.

Still another object of this invention is to provide in a system of the character mentioned, protection of the synchronous motor in event of pulling out of step or synchronism.

A specific object of the invention is to selectively effect deenergization of the synchronous motor control system, or resynchronizing of the motor in event of pull-out.

Yet another object of the invention is to provide in a synchronous motor control system, a timing cycle independently controlled of the synchronous motor, and during which normal starting of the motor must be effected.

More specifically, it is an object of this invention to provide a system of the character referred to, in which energization of the field windings is controlled in response to selected electrical characteristics of the motor, and including a timing cycle established independently of the synchronous motor and which functions in conjunction with the energizing control for the field windings to prevent energization of the field windings when the rate of change of the selected electrical characteristics is below a predetermined value.

Other objects and advantages will be apparent from a study of the following specification when considered in conjunction with the accompanying drawings in which, Figure 1 is a schematic diagram of a synchronous motor control system embodying the principles of this invention.

Figure 2:
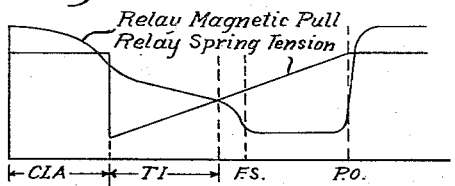

Fig. 2 is a graphic representation of the operating characteristics of the field application device illustrated in Fig. 1 and, Fig. 3 is a schematic diagram of a synchronous motor control system which is a modification of the control system of Fig. 1.

In a broad sense, the invention hereinafter disclosed resides in the use of a timing device and its auxiliary equipment operated independently of the motor and its field application control, and which functions in conjunction with the field application control for controlling the energization of the motor field windings and for providing protection against premature field application loss of field, pull-out, etc.

Referring now to Fig. 1, the control system for the synchronous motor M comprises, generally, a main switch, such as C, for connecting the primary or armature windings A of the synchronous motor to the source of alternating current indicated generally by the line conductors L1, L2 and L3, and for establishing energizing circuits for the elements of the control system; a field application device 56, which responds to armature current variations with slip-frequency of the machine, and a timing device 48, which embodies, generally, a timing mechanism including the motor 48M the electromagnetic relay 48C and a plurality of auxiliary control elements such as the relays 48X and 48Y.

Before proceeding with a description of the control system in general, an understanding of the operation of the control devices 56 and 48 should be had in order that the invention may be more readily appreciated.

The field application device 56 comprises a field application relay 56X having the armature operated contact members 56X1, a motor 56M, which drives a plurality of contact disks 56M1, 56M2, 56M4, 56M5 and 56M6 in addition to a cam 4 and a relay 56Y. The field application relay 56X is provided with a single coil which is energized through the medium of a bridge-type rectifier 10, from the current transformer T, which transformer is energized according to the variations of the currents in the conductor L2, connected with the synchronous motor M through the contact members C2 of the main switch C. The pivoted armature of relay 56X is provided with a spring 2 which biases the armature away from the core to its switch closing position. The tension of spring 2 is varied by means of a cam 4 which is driven by the motor 56M. The combined operations of the relay 56X and the motor 56M produce operating characteristics, such as indicated in Fig. 2.

As will be seen from this figure as well as from the position of the cam 4 in Fig. 1, the tension of the spring 2 at the beginning of the operating cycle of the field application device 56 is at its maximum value. This condition exists at the beginning of the starting cycle for the synchronous motor M. When the armature windings of the synchronous motor are first connected to the conductors L1, L2 and L3, the current flowing through these conductors is of some relatively high value. Accordingly, the coil of the relay 56X has a high value current flowing therethrough. This field application relay is so designed that the average magnetic pull, as indicated in Fig. 2 for the starting currents encountered, is of some value higher than the initial spring tension. Accordingly, the relay armature is moved to its switch open position. As the motor increases in speed, the current flowing through the armature windings thereof, and, hence, the current flowing in the conductor L2 decreases. The average magnetic pull of the relay 56X correspondingly decreases until at some point, which is determined entirely by the starting characteristics of the motor, the relay magnetic pull is no longer sufficient to hold the armature against the bias of the spring 2. As a result, the armature drops out. Immediately upon dropping out of the armature, the contact members 56X1 are closed and a circuit established in part through these contact members to energize the motor 56M. The motor operates the cam 4 in such a direction as to immediately reduce the tensile loading of spring 2 to a very low value. Since, as shown in Fig. 2, the relay average magnetic pull is of some value higher than the spring tension for this new setting, the armature of the relay 56X is immediately again attracted to its switch open position. The motor 56M, however, continues in its operation and operates the cam 4 in such a direction as to gradually increase the tension of the spring 2, and hence, the switch closing bias applied to the armature increases. Meanwhile, the synchronous motor M is accelerated as an induction motor, the armature currents are gradually becoming smaller and the slip-frequency lower in alternations per second. When the speed of the motor is approximately 95 to 98 per cent of the synchronous speed, the relay magnetic pull falls to such a value that the magnetic forces holding the armature in its operated position are overcome by the increasing tension of the spring 2. As a result, the armature again drops out and closes its contact members 56X1. In this last operated position, the armature contacts 56X1 complete a circuit across the conductors X' and Y' including the contacts 56X1, the contacts 56Y2, the contact disc 56M4 and the coil of the relay 41 for energizing the relay 41 which in turn through its contacts 41B and 41C energizes the field windings of the synchronous motor. This causes the machine to be synchronized, at which time the magnetic pull of the field application relay 56X, due to the drop in armature currents when the motor is synchronized, becomes a very low value. The motor 56M continues in its operation until it again reaches the position indicated in Fig. 1, at which time the energizing circuits for this motor are disconnected.

The initial cycle of operation of the field application device 56 is controlled entirely by the synchronous motor armature currents, hence this period is termed the current limit acceleration period, and is indicated in the graph of Fig. 2 by the portion CLA. The timing cycle begins immediately at the end of the period of current limit acceleration and is controlled, in part, by the diminishing armature currents, as well as the rapidity with which the relay spring tension is increased. This period is known as the timing interval and is designated TI in Fig. 2. This interval ends at approximately 95 to 98 per cent of synchronous speed, as indicated by the dotted line at the end of this interval. The dotted line FS represents full speed of the motor. Thus it will be seen that by providing a period of current limit acceleration, in which the motor is brought up to about 90 per cent of synchronous speed, and thereafter providing a timing interval, the motor may be accelerated to within but a few per cent of synchronous speed, at which point it may be synchronized with a minimum of electrical disturbance.

The timing device 48 functions independently of any of the characteristics of the synchronous motor M. Its sequentially operated contact members 48S and 48L of which 48S is the first operated contact, and 48L is the last operated contact, are operated by the cams 6 and 8 which are, in turn, driven by the motor 48M through a gear train 11, which includes a disk-type positive clutch 12. This clutch is controlled by the armature member of the electromagnet 48C, which armature member also operates the moving elements of the contact members 48S and 48L, respectively, to their disengaged and engaged positions. The moving armature is hinged to a portion of the magnetic framework, not shown, and held away from its magnet core by a spring 14 which is positioned below the point of hinging. An arm, such as 16, is hinged substantially centrally of the armature and is provided with a bifurcated extremity 16a which operates the moving element of the clutch to engage the confronting faces when the armature member is moved to its attracted position. Two contact fingers 18 and 20 are pivoted at the lower end of the armature and each is free to move independently of the armature against the spiral springs 22. The moving contact elements of the contact members 48S and 48L are fastened at the extremities of the contact fingers 18 and 20. The stationary contact elements are conveniently secured to the base of the relay. Coil springs, such as 24, bias the contact fingers 18 and 20 in a direction opposite to the bias provided by the spiral springs 22. The mechanical forces applied by the spiral and the coil springs to the respective contact fingers are so arranged that when the armature moves to the left, the force exerted by the spiral springs on the contact fingers is sufficient to bias the movable contact elements against the bias of the coil springs 24 to their resetting position. When the armature is moved to the right, the spiral springs are unwound and thus their force diminished. The bias of the springs 24 on the contact fingers at this time predominates; thus, when the latch elements 26 and 28 are actuated by their respective cams 6 and 8, the movable contacts are operated by the coil springs 24. Suitable linkage 30 is provided between the latch elements 26 and 28 that the cam 6 may operate only the latch element 26. However, the cam 8 upon operating the latch element 28, actuates the pivoted link 30 which, in turn, actuates the latch 26 to effect disengagement of the contact members 48S.

From the foregoing it will be seen that the motion of the armature of the electromagnet 48C causes the clutch disks to engage, but will not close or open the contacts 48S and 48L, as the case may be, until the trip mechanism latches 26 and 28 are released. When these latches are released, and if the armature is still closed, the contact arms 18 and 20 are moved to the right as viewed in Fig. 1 by the action of the coil springs 24, which, under this condition, provide the predominating force to open the contacts 48S and close the contacts 48L. When the electromagnet 48C and the motor 48M are deenergized, the cams are returned to their initial position by means of a spring 32 which acts upon the shaft carrying the cams. At the same time, the armature moves to the left closing the contact members 48S and opening the contact members 48L. The latch members 26 and 28 are then biased to latching positions. The settings of the cams 6 and 8 can be varied to obtain the desired sequential operation of the contacts 48S and 48L.

The relay 48X is operated immediately upon energizing of the conductors X′ and Y′ of the control system. The conductors X′ and Y′ are energized by the auxiliary contacts C6 and C7 of the main switch. This relay functions in connection with the relay 40 and the contact member 48S to provide premature field application protection. The relay 48Y, which is energized upon closure of the contact members 48L, functions in conjunction with the relay 56Y which forms a part of the field application device 56, and which is controlled thereby, to provide protection against prolonged operation of the motor as an excessively loaded induction motor.

The relay 41 is controlled as to the time of its energization by the field application device 56 at the contacts 56X1 thereof in the circuit previously traced for the coil of relay 41. In its energized position, its contact members 41A are open to open the field discharge circuits and its contact members 41B and 41C are closed to connect the field winding F to the source of direct current which energizes this field winding.

Assuming a condition of normal operation, the function of the system is as follows:

Closure of the switch S with the drum controller DC set in its off position completes a circuit from the conductor X through the contact segment DC2 of the drum controller, the back contact members C5 of the main switch C, the coil of the relay 52Y to conductor Y. This relay immediately picks up, closing its contact members 52Y1 and 52Y2. The contact members 52Y1 complete a holding circuit for the coil 52Y across the conductors X and Y, while the contact members 52Y2 partially establish an energizing circuit for the coil of the relay 52X. Operation of the drum controller DC to its closed position completes this partially established circuit through the contact segment DC3 of the drum controller and the contact segment of the disk contact 56M2. The relay 52X is thus energized and closes its contact members 52X1 which connect the operating coil of the main switch C across the conductors X and Y. The main switch C immediately picks up, closing its main line contacts C1, C2 and C3, thereby energizing the armature winding A of the synchronous motor and starting this motor as an induction motor. At the same time, the contact members C4, C6, C7 and C8 are closed and the contact members C5 opened. Closure of the contact members C4 establishes, in part, a tripping circuit for the coil of the tripping solenoid 52T which latches the main switch C in its closed position. This circuit may be completed to effect tripping of the contactor by operation of the drum controller DC to its trip position, thus completing the tripping circuit through the contact segment DC1. Closure of the contact members C6 and C7 of the main switch C energizes the conductors X′ and Y′, which supply the control system. Energization of the conductors X′ and Y′ causes the relay 48X to pick up and close its contact members 48X1 and 48X2. The energizing circuit for this operation may be traced through the contact members 48Y2 of the relay 48Y, the coil of the relay 48X, back contact members 40B of the relay 40, the contact members 48S, and thence to the conductor X′. Closure of the contact members 48X1 establishes a partial tripping circuit for the coil of the tripping solenoid 52T, to provide protection against premature field application. This circuit is completed upon premature energization of the field winding by the contact members 40A of the relay 40, which is energized by the currents supplied to the field winding F. When the motor armature is connected to the conductors L1, L2 and L3 as previously explained, the coil of the field application relay 56X is excited with a fairly high current. As a result, the armature is moved to its switch open position and the contact members 56X1 are open. This opens the starting circuit for the motor 56M, which may be traced from the conductor Y′, the motor 56M, contact disk 56M5, which in the position shown is conducting, contact members 56Y3 of the relay 56Y, contact members 56X1 to the conductor X′. Also at the time the main switch C closes, the electromagnet 48C is energized through a circuit which may be traced from the conductor X′, the coil of electromagnet 48C, contact members 41F, the resistor R2 to the conductor Y′. The motor 48M is also energized, since it is connected in parallel with the coil of the electromagnet 48C. The electromagnet 48C now closes, closing its seal-in contacts 48S1 and establishing a holding circuit for both its coil and the motor 48M, which circuit is independent of the contact members 41F. Operation of the armature of the electromagnet 48C engages the disk clutch 12, thus causing the cams 6 and 8 to be rotated. As the projection of the cam 6 engages the tripping latch 26, the contact members 48S are opened. This opens the previously traced tripping circuit for the coil of the tripping solenoid 52T. The relay 48X, however, remains energized, since it is yet energized in a circuit from the conductor X′, the contact members 56Y1, the link LS1 of the link switch LS, the coil of the relay 48X, contact members 48Y2 to the conductor Y′.

As the speed of the synchronous motor M increases, the magnetic pull of the relay 56X decreases sufficiently that the armature is spring biased to its switch closing position. This closes the contact members 56X1 and completes the energizing circuit for the motor 56M across the conductors X′ and Y′ through the medium of the contact disk 56M5 and the contact members 56Y3. The motor immediately begins to rotate in the direction indicated by the arrow adjacent the cam 4. Thus the spring tension is reduced to some low value and, as shown in Fig. 2, the armature of the relay 56X is attracted to its switch open position, thus again opening the contact members 56X1.

Opening of the contact members 56X1, opens the starting circuit previously traced for the motor 56M. Another circuit for continuing the operation of the motor throughout the timing cycle is completed through the contact disc 56M1. At the same time the coil of the relay 56Y is connected across the conductors X′ and Y′ through the medium of the contact disks 56M1 and 56M6, the contact disc 56M6 being a substantial duplicate of the contact disc 56M1. This relay is thus energized and picked up, opening its contact members 56Y1 and causing the relay 48X to drop out and also opening its contact members 56Y3 in the starting circuit for the motor 56M and closing its contact members 56Y2, which establishes a partial holding circuit for the coil of the relay 56Y, which holding circuit also includes the contact members 41E of the relay 41 and the contact members 56X1, and also partially establishes an energizing circuit for the relay 41 in conjunction with the contact disc 56M4, which is completed when the contact members 56X1 are later closed.

The energizing circuit for the relay 41 may be traced from the conductor X′, the contact members 56X1 now open, the now closed contact members 56Y2, the now conducting contact disk 56M4 to the coil of relay 41 and thence to the conductor Y′.

As the motor armature currents decrease and the magnetic pull of the field application relay 56X decreases, the relay spring tension is gradually increased until, at 95 to 98 per cent of synchronous speed, the curve of the average magnetic pull of field application relay 56X intersects the curve of the spring tension, as shown in Fig. 2, at which point the armature of the relay 56X drops out and closes its contact members 56X1. This immediately energizes the relay 41 through the contact members 56Y2 and the contact disk 56M4. The relay 41 picks up, opening the field discharge circuit at the contact members 41A and connecting the field winding F at contacts 41B and 41C to a suitable source of direct current, generally indicated by plus and minus.

The relay 41 establishes its holding circuit across the conductors X′ and Y′ through a circuit including the link LS3 of the link switch LS and its contact members 41D. Closure of the contact members 41E completes the holding circuit for the relay 56Y, which includes the contact members 56X1, 56Y2, and the contact members 41E as previously explained. Opening of the contact members 41F has no effect upon the energizing circuits for the electromagnet 48C and the motor 48M, since the seal-in contacts 48SI bypass the contacts 41F.

As the projection of cam 8 engages the latch member 28, the contact finger 20 is released and biased under the action of the spring 24 to engage the stationary contact of the contact members 48L. This completes an energizing circuit for the coil of the relay 48Y across the conductors X′ and Y′. The relay 48Y now picks up, closing its contact members 48Y1, 48Y3 and 48Y4. Since the operating conditions are assumed normal, closure of contact members 48Y1 has no immediate effect upon the system. Closure of the contact members 48Y4 shunts the coil of the electromagnet 48C and the motor 48M from the circuit, thus deenergizing both of these elements. Closure of the contact members 48Y3 establishes a holding circuit for the relay 48Y, which may be traced from the conductor X′, the link LS2 of the link switch LS, the contact members 48Y3 and the coil of the relay 48Y to the conductor Y′. This seals this relay in its energized position until the conductors X′ and Y′ are deenergized through opening of the main switch C or opening of the link LS2.

Deenergization of the coil of the electromagnet 48C and the motor 48M allows the armature of the electromagnet 48C to move to the left, thereby resetting the contacts 48S and 48L. At the same time, the clutch 12 is disengaged and the cams 6 and 8 are rotated to their inactive positions. Closure of the contact element 48S now has no effect upon the tripping circuit for the coil 52T, since the contacts 48X1 are open and the relay 48X may not be energized until the contact members 48Y2 are again closed.

The protection afforded by the cooperating action of the various elements of the control system may best be understood by assuming various operating conditions of the system.

*Premature field application*

Premature application of the field winding F may most likely result from failure of the armature of the field application relay 56X to move to its actuated position when the synchronous motor armature winding is connected to the line by the main switch C. Under such a condition, the motor 56M is immediately operated, the relay 56Y is energized through the contact disks 56M1 and 56M6 to close its contact members 56Y2 and the contact disk 56M4 completes the energizing circuit for the relay 41. Thus the field is energized substantially at the beginning of the starting cycle of the system. It will be remembered, however, that the relay 48X is energized immediately upon operation of the main switch C, thus the contact members 48X1 of this relay are closed when the relay 40 is energized by premature application of the field. The coil of the tripping solenoid 52T is energized by a circuit which may be traced from the conductor X′, to the contact members 48S, the contact members 40A of the relay 40, the contact members 48X1 and the coil of the tripping solenoid 52T to the conductor Y. The tripping solenoid armature thus moves to the left and releases the main switch C to permit its movement to its inoperative position, thereby deenergizing the system.

*Field failure at end of starting cycle*

For field failure due to source voltage failure at the end of the starting cycle, in which case the timing device 48 is reset, the tripping solenoid is energized by a circuit which may be traced from the conductor X', the contact members 48S, the now closed contact members 40B, since the relay 40 is deenergized due to failure of source voltage, the link LS1 of the link switch, the contact members 48Y1 of the relay 48Y, which it will be remembered is sealed in as long as the conductors X' and Y' are energized, the coil of the tripping solenoid 52T to the conductor Y. Hence, upon failure of source voltage, the main switch C is tripped and the system deenergized.

For field failure at the end of the starting cycle due to failure of the relay 41 to operate upon establishing its energizing circuits, the coil of the tripping solenoid 52T is energized in the circuit traced in connection with field failure due to failure of source voltage. The contact members of the relay 41 play no part in this energizing circuit.

*Loss of field during normal operation as synchronous motor*

The conditions existing when the synchronous motor loses its field during periods of its normal operation as a synchronous motor when the link switch LS is connected for tripping on pullout only are similar to those existing as a result of field failure at the end of the starting cycle. The tripping circuit for the coil of the tripping solenoid 52T is, in this instance, the same as that described for field failure at the end of the starting cycle.

*Pull-out*

If for any reason, with the link switch LS connected for tripping on pull out, the synchronous motor pulls out of step or synchronism due to increasing mechanical loading or moderate weakening of the excitation of field winding F, the armature winding reaction produces current surges in the conductors L1, L2 and L3. Thus in a manner similar to starting of the machine, the average magnetic pull of the field application relay 56X rises to some high value as shown at the right in Fig. 2 at the point designated PO and the relay armature immediately is actuated to its switch open position. This opens the holding circuit at 56X1 for the coil of the relay 56Y, causing this relay to drop out and close its contact members 56Y1. When the link switch is connected for trip out on pull out, this connects the coil 52T across an energizing circuit which may be traced from the conductor X', the contact members 56Y1, the closed contact members 48Y1, the coil of the tripping solenoid 52T to the conductor Y. The main switch C is thus tripped and the system deenergized.

*Prolonged operation as induction motor*

During starting of the synchronous motor as an excessively loaded induction motor, the field application relay 56X is energized and the armature thereof actuated to its switch open position. At the same time, the timing device 48 is proceeding with its timing cycle independently of the characteristics of the synchronous motor to open its contact members 48S and eventually close its contact members 48L. As the armature of the relay 56X, due to a high average magnetic pull throughout this timing cycle since the rate of change of the motor armature currents is low, has not been permitted to drop out, the timing cycle of the motor 56M can not begin; hence, the field winding F of the synchronous motor may not be energized to synchronize the machine. The motor thus continues to operate as an induction motor. Since the contact disks 56M1 and 56M6 remain in their initial insulated position, the relay 56Y is not energized and the contact members 56Y1 thereof are closed. When the contact members 48L are closed, the relay 48Y immediately picks up, closing its contact members 48Y1. This completes a tripping circuit for the coil of the solenoid-tripping device 52T, which may be traced from the conductor X', the contact members 56Y1, the contact members 48Y1, the coil of the tripping solenoid 52T to the conductor Y. The system is thus immediately deenergized.

The foregoing description of the function of the system to protect the synchronous motor under adverse operating conditions has provided tripping-out of the main switch C and deenergizing of the control system for all the adverse operating conditions noted. If it is desired, for example, in the event of pull-out to attempt resynchronizing of the machine, the link switch LS may be operated to its right-hand position. In this right-hand position, the link LS3 is the only conducting link of the switch.

*Premature field application*

With the switch LS in its resynchronizing position, premature field application effects tripping of the main switch C to deenergize the system through the medium of contact members 48X1, 40A and 48S as in this same case with the switch LS in its left-hand position. Tripping is desired under premature field application conditions primarily because it is an indication that the field application relay 56X has not functioned properly, and in all probability, would again not function on a resynchronizing cycle. Since the damages which may result both to the synchronous machine and its connected equipment, are serious, and prolonged external system disturbance which would result therefrom, is undesirable, immediate deenergizing of the system should logically be had that a check of the system elements causing the faulty operation can be made.

*Field failure at end of starting cycle*

Field failure at the end of the starting cycle, resulting from failure of source voltage will provide operation of the motor as an induction motor only if the motor is lightly loaded. Under these conditions no serious effects may result. However, if the load is heavy, the armature currents will again rise, the relay 56X will pick up and a resynchronizing cycle will be attempted. Tripping-out of the main switch C is not effected even though, under these conditions, the relay 48Y is energized and its contacts 48Y1 are closed because the contact members 41E are closed, and the holding circuit through these contact members for the relay 56Y completed. Since the function of the system has been normal, the contact members 56X1 are closed to maintain together with the contact members 56Y2 and 41E, the holding circuit for the relay 56Y. Immediately upon occurrence of heavy armature currents due to an increase in the mechanical load on the motor, the relay 56X picks up and immediately a resynchronizing cycle for the synchronous motor begins.

Should the relay 41 fail to operate at the end of the starting cycle to apply direct current excitation to the field winding F, the contact members 41E remain open, and thus when the contact disks 56M1 and 56M6 open or become nonconducting during the normal operating cycle of the motor 56M, the energizing circuit for the relay 56Y is opened. Since the contact members 41E are open, the holding circuit for this relay is also open, hence when the contact disks 56M1 and 56M6 reach their insulating position, the relay 56Y drops out. Immediately upon dropping of the relay 56Y, the starting circuit for the motor 56M is completed. The cam 4 then operates to relieve the spring tension of the field application relay 56X, and the relay armature is attracted to its switch open position to start a resynchronizing cycle.

Loss of field during normal operation as synchronous motor

With the link switch LS connected for resynchronizing, loss of field during normal operation of the motor, resulting from a failure of the source voltage, with the relay 41 remaining up and its contact members 41E remaining closed, the relay 56Y will be held in its energized position. The motor then operates as an induction motor until such time that the armature currents may rise sufficiently to increase the current in the coil of the field application relay 56X by an amount such that a resynchronizing cycle may be initiated. If under resynchronizing conditions, the synchronous motor armature current remains high throughout the timing cycle period established by the device 48, the relay 48Y upon closure of the contact members 48L is energized, and in conjunction with the relay 56Y establishes a tripping circuit for the main switch C.

Pull out

With the link switch LS in the resynchronizing position, the holding circuit previously established for the relay 48Y through the link LS2 no longer exists. This relay is now entirely dependent for completion of its energizing circuit upon the contact members 48L, thus when the timing cycle of the device 48 is completed and the contact members 48L open, the relay 48Y is deenergized and the contact members 48Y1 are opened. Thus upon pull-out of the synchronous motor and operation of the relay 56X, a tripping circuit for the main switch C when the contact members 56Y1 close, is not established. When the contact members 56X1 open, the holding circuit for the relay 41 now established, in part, through these contacts is interrupted at this point and the relay 41 drops out, thereby deenergizing the field winding F. With interruption of the field winding current, the relay 40 drops out and closes its contact members 40B. This immediately energizes the relay 48X through the contact members 48S, the contact members 40B, the coil of the relay 48X and the contact members 48Y2. The contact members 48X1 are thus closed and a portion of the premature field protection circuit established. From this point on the resynchronizing cycle proceeds in the same manner as for starting the system.

Prolonged operation as induction motor

The function of the system, should the motor be heavily loaded in starting and thus operate as an induction motor for a prolonged period of time, is the same with the link switch LS set in the resynchronizing position as with the switch set in its tripping position. The field application relay 56X picks up and remains up throughout the timing cycle of the device 48 due to the slow change of the synchronous motor armature currents, at which time the relay 48Y is energized and its contact members 48Y1, in conjunction with the closed contact members 56Y1, establish the energizing circuit for the tripping solenoid 52T.

The embodiment of the invention illustrated in Fig. 3 is in many respects similar to that illustrated in Fig. 1. The most important difference resides in the field application device 156. This device differs specifically from the field application device 56 illustrated in Fig. 1, in that a timing cycle is not provided after the relay 156 has performed its operation. The timing device 48 is in this application essentially identical with that of Fig. 1. In this system parts, corresponding to those of Fig. 1, have been given like reference numerals.

The field application relay 156 is essentially a polarized relay and comprises a U-shaped core member about the opposite core extremities of which are wound the coils 156X and 156Y. The coil 156Y is connected directly to a suitable source of direct current, such a source of direct current may, for example, be that which is used to energize the field winding F. The flux produced by this coil in the core is insufficient to actuate the armature member.

The coil 156X is connected across an inductance element or reactor which is connected in series with the field discharge resistor in the field discharge circuit. The impedance of this inductance element varies with the frequency of the currents induced in the field winding circuit when the discharge circuit is closed. The frequency of these induced currents is the slip-frequency of the machine and decreases as the speed of the motor approaches synchronous speed. Thus the alternating current, which flows in the winding 156X, is of high intensity and high frequency when the motor armature winding is connected to its alternating current supply, and decreases in both intensity and frequency as the motor approaches synchronous speed. The relay is so designed that a time interval of certain duration, during which the flux is of a value below a certain predetermined holding value, must exist before the relay armature will drop out. The magnetic flux produced in the relay core by the direct current winding 156Y and the alternating current coil 156X are in opposition during alternate half cycles of the alternating current cycles. When the frequency is high, the time interval during which these fluxes are in opposition is very small, hence the relay armature does not drop out. However, as the alternating current frequency decreases, and at the same time the intensity of the alternating current decreases, a point is eventually reached where the flux remaining to hold the relay armature up is insufficient for a given interval of time. As a result, the relay armature drops out.

The operation of the system is as follows:

Pressing the start button connects the coil of the main switch C directly across its direct curretn source of supply. The main switch immediately picks up and is latched in by the tripping solenoid 52T. The main line contacts C1, C2 and C3 are closed and the armature winding A of the motor is energized, starting the motor as an induction motor. Immediately the field application relay 156 picks up and opens its contact members 156A. As the motor accelerates and synchronous speed is approached, this relay drops its armature to close the contacts 156A and thereby energize the relay 41 to energize the field winding F at the contacts 41B and 41C. During this interval, however, the timing device 48 has been energized through the medium of the contacts C7 and 40X3. The electromagnet 48C thus closes its contact members 48SI and energizes the motor 48M and, at the same time, engages the confronting faces of the disk clutch 12. After a short interval of time, the contact members 48S are opened and at a later time, the contacts 48L close. When the contact members 48L close, the relay 40X is energized through a circuit which includes the contact members C6, the contact members 48L and the coil of the relay 40X. This relay immediately picks up and opens its contact members 40X3, thereby denergizing the coil of the electromagnet 48C and the motor 48M. The device 48 now resets.

In this embodiment of the invention, protection against the various faulty operating conditions noted in connection with Fig. 1 is provided.

Premature field application

In the event that the field application relay 156 fails to operate at the beginning of the starting cycle for the motor, the relay 41 is picked up and causes the field winding F to be energized. This immediately picks up the relay 40 and closes its contact members 40A. This establishes a circuit for energizing the coil of the tripping solenoid 52T which may be traced from the positive terminal through the contact members C6, the contact members 41D, the contact members 40X1, the contact members 48S, the contact members 40A, the coil of the tripping solenoid 52T and the contact members C4 to the negative terminal. The main switch C thus moves to its inoperative position and disconnects the motor from the line.

Field failure at end of starting cycle.

In the event of failure of the source voltage for the field winding F, operation of the relay 41 will not apply the energizing current to the field winding. As a result, the relay 40 remains deenergized and its contacts 40B remain closed. Under these conditions, the tripping solenoid is energized through a circuit beginning with a positive terminal through the contact members C6, the contact members 41D, the contact members 40X2 of the relay 40X, now energized as a result of the closing of contact members 48L during the normal timing cycle, the contact members 40B, the coil of the tripping solenoid 52T, and the contact members C4 to the negative terminal.

Should the relay 41 fail to operate even though its energizing circuit is completed, a trip circuit for the coil 52T is not established because the contact members 41D of the relay 41 are open. The relay 40X picks up, allowing the timing device 48 to reset, but since 41D is open, drops out when the contact members 48L open causing the device 48 to begin another timing cycle. This cyclic operation of the device 48 continues and the motor continues to operate as an induction motor as long as the motor is very nearly at synchronous speed. When the speed drops sufficiently, due to loading of the machine to produce sufficiently high slip-frequency currents to operate the field application device 156, a resynchronizing cycle is begun.

Loss of field during normal synchronous motor operation

In the event of loss of field due to source voltage failure, the relay 40 drops out and closes its contact members 40B. This completes the tripping circuit for the tripping solenoid through the contact members C6, 41D, 40X2, 40B, the coil of tripping solenoid 52T and the contact members C4 to the negative terminal. The contact members 40X2 are closed under this condition, since the contact members 41D, which complete the holding circuit for the relay 40X through the contact members C6, are closed.

Should the relay 41 for any reason drop out and thus cause a loss of field, the relay 40X immediately drops out closing its contact members 40X3. The device 48 immediately starts another timing cycle. Should the motor pull far enough out of step, the slip-frequency currents become sufficient to operate the device 156 and a resynchronizing cycle is immediately begun.

Pull out

In the event the motor should pull out of step due to increasing mechanical load or weakening of the field, the field application relay 156 immediately picks up and deenergizes the relay 41. Since the field circuit is now open, the relay 40 drops out at the same time the relay 40X drops out, since its holding contacts 41D are open. With the closing of the contact members 40X3, the timing device 48 is again energized and a resynchronizing cycle is begun.

Prolonged operation as induction motor

Should the motor be started with too heavy a mechanical load, the field application relay 156 holds its armature in the operated position throughout the timing cycle provided by the timing device 48. At the close of this timing cycle, the contact members 48L close. This completes a circuit for the tripping solenoid from the positive terminal through the contact members C6, the contact members 48L, the contact members 40B, the coil of the tripping solenoid 52T, and the contact members C4 to the negative terminal. At the same time, closure of the contact members 48L energizes the relay 40X opening its contact members 40X3 and allowing the timing device to reset.

From the foregoing it will be seen that the provision of a timing cycle, by means of a device such as 48, during which timing cycle synchronizing operations of the motor must be completed, provides a control of the operating conditions of the motor during its starting cycle, which protects the motor against damage resulting from faulty operation.

The foregoing disclosure and the showings made in the drawings are merely illustrative of the principles of this invention and are not to be considered in a limiting sense. The only limitations are to be determined from the scope of the appended claims.

I claim as my invention:

1. A control system for a synchronous motor having conventional windings including armature windings and field windings comprising, in combination, electrical means operative to energize said armature windings, control means responsive to selected electrical characteristics of said motor for energizing said field windings, timing means having sequentially operated control elements, means responsive to energization of said field windings and operative in conjunction with the first operated of said control elements for rendering said electrical means inoperative only during the time limits determined by the first operated control element, means responsive to the second operated of said control elements, and means forming a part of said control means and operative in conjunction with said means responsive to the second operated control element when the rate of change of said selected electrical characteristics of said motor is below a predetermined value, for also rendering said electrical means inoperative.

2. A control system for a synchronous motor having conventional windings including armature windings and field windings comprising, in combination, electrical means operative to energize said armature windings, control means responsive to selected electrical characteristics of the synchronous motor for energizing said field windings, timing means, and means responsive to energization of said field windings and operative in conjunction with said timing means within limits of time established by said timing means, for rendering said electrical means inoperative.

3. A system of control for a motor comprising, in combination, a synchronous motor having conventional windings including armature windings and field windings, electrical means for energizing the armature windings, control means responsive to selected electrical characteristics of the motor for energizing the field windings, timing means, means responsive to operations of said timing means, and means forming a part of said control means and operable in conjunction with said means responsive to operations of said timing means when the rate of change of said selected electrical characteristics is below a predetermined value, for rendering said electrical means inoperative.

4. In a system of control for a motor, the combination of, a synchronous motor having conventional windings including armature windings and field windings, a source of alternating current, a contactor for connecting and disconnecting said armature windings with said source of alternating current, an electrical tripping device for said contactor, a source of direct current, a field switch for connecting and disconnecting said source of direct current with said field windings, control means responsive to selected electrical characteristics of said motor for effecting operation of said field switch, a timing device having normally open contact members, a relay having contact members which are closed upon operation thereof, said relay being energized upon closure of said contact members of said timing device, means forming a part of said control means and controlled thereby, and an energizing circuit for said electrical tripping device including the contact members of said relay and said means forming a part of said control means.

5. In a system of control for a motor, the combination of, a synchronous motor having conventional windings including armature windings and field windings, a source of alternating current, a contactor for connecting and disconnecting said armature windings with said source of alternating current, an electromagnetic tripping device for said contactor, a source of direct current, a field switch for connecting and disconnecting the field windings with said source of direct current, control means responsive to selected electrical characteristics of said motor for effecting operation of said field switch, a timing device having normally closed contact members, a first relay having contact members which are closed upon energization of said first relay, said first relay being energized upon energization of said system, a second relay energized upon operation of said field switch and having contact members which are closed upon energization of said second relay, an energizing circuit for said electromagnetic tripping device including, the contact members of said first relay, the contact members of said second relay and the normally closed contact members of said timing device; the closed contact members of said timing device being opened after a predetermined limit of time and being effective to electrically open said energizing circuit for the electromagnetic tripping device.

6. In a system of control for a motor, the combination of, a synchronous motor having conventional windings including armature windings and field windings, a source of alternating current, a contactor for connecting and disconnecting said armature windings with said source of alternating current, an electrical tripping device for said contactor, a source of direct current, a field switch for connecting and disconnecting said field windings with said source of direct current for synchronizing said motor, control means responsive to selected electrical characteristics of said motor for effecting operation of said field switch, a timing device having a pair of sequentially operated contact members, the first operated of said sequentially operated contact members being a normally closed contact and the second operated of the sequentially operated contact members being a normally open contact, a first relay having contact members which are closed upon energization of said first relay, said first relay being energized upon energization of said system, a second relay energized upon operation of said field switch and having contact members which are closed upon energization of said second relay, a third relay operated upon closure of said second operated of the sequentially operated contacts, said third relay having contact members which are closed upon operation of the third relay, parallel energizing circuits for said electrical tripping means, one of said circuits including the contact members of the first relay, the contact members of the second relay and the first operated of the sequentially operated contact members, and another of said circuits including said control means and the contact members of said third relay, and switching means operable in one position to effect tripping of said contactor through said parallel circuits, and in another position operable to effect another synchronizing cycle of said motor through said control means.

7. In a system of control for a motor, the combination of, a synchronous motor having conventional windings including armature windings, and field windings, a source of alternating current, a contactor for connecting and disconnecting said armature windings with said source of alternating current, a source of direct current, a field switch for connecting and disconnecting said field windings with said source of direct current, control means responsive to selected electrical characteristics of said motor for effecting operation of said field switch to synchronize said motor, a timing device, an electrical device for effecting operation of said contactor to its disconnected position, a first normally incomplete electrical circuit for energizing said electrical means, means operable upon premature energization of said field windings by said field switch, for completing said electrical circuit and thereby energizing said electrical means, means operable after a predetermined limit of time for rendering said first electrical circuit inoperative, a second normally incomplete electrical circuit for energizing said electrical means, means operable after a predetermined limit of time greater than that of said first-mentioned limit of time for completing said second electrical circuit and means for rendering said second electrical circuit inoperative.

MARK A. PRINGLE.